United States Patent
Norde et al.

(10) Patent No.: US 8,222,524 B2
(45) Date of Patent: Jul. 17, 2012

(54) PROTECTIVE CASING FOR A HIGH VOLTAGE CABLE

(75) Inventors: Niklas Norde, Karlskrona (SE); Anders S. Hansson, Lyckeby (SE)

(73) Assignee: ABB Technology Ltd., Zürich (CH)

( * ) Notice: Subject to any disclaimer, the term of this patent is extended or adjusted under 35 U.S.C. 154(b) by 540 days.

(21) Appl. No.: 12/433,054

(22) Filed: Apr. 30, 2009

(65) Prior Publication Data

US 2009/0272561 A1 Nov. 5, 2009

(30) Foreign Application Priority Data

Apr. 30, 2008 (EP) ..................................... 08155452

(51) Int. Cl.
*H01R 4/00* (2006.01)

(52) U.S. Cl. ......................... 174/84 R; 174/88 R; 174/92

(58) Field of Classification Search .................. 174/74 R, 174/78, 84 R, 88 R, 36, 92, 93
See application file for complete search history.

(56) References Cited

U.S. PATENT DOCUMENTS

| 1,723,846 | A | | 8/1929 | Eby | |
|---|---|---|---|---|---|
| 4,507,008 | A | * | 3/1985 | Adl et al. ...................... | 403/275 |
| 5,066,095 | A | * | 11/1991 | Dekeyser et al. ............... | 385/99 |
| 5,661,842 | A | * | 8/1997 | Faust ............................ | 385/139 |
| 5,691,505 | A | * | 11/1997 | Norris ............................ | 174/51 |
| 6,172,304 | B1 | | 1/2001 | Laurent et al. | |
| 6,377,735 | B1 | * | 4/2002 | Bernstein et al. ............. | 385/100 |
| 6,422,900 | B1 | * | 7/2002 | Hogan .......................... | 439/578 |
| 6,434,317 | B1 | * | 8/2002 | Dyer et al. ..................... | 385/139 |
| 7,137,671 | B2 | * | 11/2006 | Passarotto et al. ............. | 301/58 |
| 7,405,358 | B2 | * | 7/2008 | Emerson ..................... | 174/88 R |
| 2006/0160415 | A1 | * | 7/2006 | Pollock ........................ | 439/559 |

FOREIGN PATENT DOCUMENTS

EP 0 110 737 A 6/1984

OTHER PUBLICATIONS

European Search Report, dated Oct. 28, 2008, issued in connection with counterpart European Patent Application No. 08155452.9-2207.

* cited by examiner

*Primary Examiner* — William Mayo, III
(74) *Attorney, Agent, or Firm* — Venable LLP; Eric J. Franklin

(57) ABSTRACT

A protective casing for a joint, termination or cross-connection of at least one high voltage cable. The protective casing includes a first material portion of a first metal material having good strength properties. The protective casing includes a second material portion of a second metal material which is fixedly attached to the first material portion. The second metal material has good soft soldering properties such that it is possible to provide a strong and tight connection between the second material portion of the protective casing and a sheath of at least one of the cable parts by a soft soldering process.

14 Claims, 3 Drawing Sheets

PROTECTIVE CASING FOR A HIGH VOLTAGE CABLE

CROSS-REFERENCE TO RELATED APPLICATIONS

This application claims priority to European patent application 08155452.9 filed 30 Apr. 2008.

TECHNICAL FIELD

The invention relates to a protective casing for a joint, termination or cross-connection of at least one high voltage cable, wherein the protective casing comprises a first material portion of a first metal material.

BACKGROUND OF THE INVENTION

A long deep-sea high voltage cable consist of a large number of cable parts which are joined together. The joining process of the cable parts is performed in situ on a cable ship or the like before the cable is laid in the sea. High voltage sea cables have a water tight sheath of lead or copper. The high pressure and the corrosive environment in the deep sea require that the joints between different cable parts have a very good protection. The same requirements apply to cable terminations or cross-connections of cables. It is known to protect the joints, terminations or cross-connections by a casing of a stainless steel material. Such a casing has the required strength to withstand the high pressure and it is resistant to corrosion. However, it is a problem to create a strong and tight connection between a stainless steel casing and the lead or copper sheath of the cable parts.

Stainless steel materials have relatively bad soft soldering properties. It is therefore difficult to make a strong and tight connection between a protective casing of a stainless steel material and a sheath of a high voltage cable by means of a soft soldering process. It is possible to connect a stainless steel casing to the sheath of a high voltage cable by means of a hard soldering process. However, due to the high temperature during a hard soldering process, there is a risk that the heat damages the sheath of the cable or other sensitive components in the vicinity of the hard soldering joint. Especially, in the relatively tough environment on a cable ship, it is difficult to construct a faultless soldering joint by means of a hard soldering process.

SUMMARY OF THE INVENTION

The object of the present invention is to enable the establishment of a strong and tight connection between a protective casing of a metal material and the sheath of a high voltage cable in a relatively tough environment.

This object is achieved according to the initially mentioned protective casing, which is characterised in that it comprises a second material portion of a second metal material which is fixedly attached to the first material portion, wherein the second metal material has good soft soldering properties such that it is possible to provide a strong and tight connection between the second material portion of the protective casing and a sheath of at least one of the cable parts by means of a soft soldering process.

According to one embodiment the first material portion preferably has a shape such that it completely encloses a connection area, such as a cable joint, a cable termination or a cross-connection of at least one cable part. Thereby, the connecting area, the termination or the cross-connection of the at least one cable is protected from external forces such as the high surrounding pressure in deep sea. Deep-sea high voltage cables have usually a sheath of lead or copper. Lead and copper are materials with good soft soldering properties. Since, the second material portion also has good soft soldering properties, it is possible to accomplish a strong and tight soldering joint between the second material portion of the protective casing and the sheath of a cable by means of a soft soldering process. The low temperature during a soft soldering process guarantees that the sheath of the cable parts or other sensitive components in the vicinity of the soldering joint will not be damage.

According one embodiment the material and the thickness of the material in the protective casing is chosen in dependence on the desired strength, corrosion resistance or other desired properties of the protective casing. Preferably the metal material of the casing should have high strength properties.

According to another embodiment of the invention, the first material portion is tubular and it has a first end part with an opening dimensioned to receive a cable part. A tubular first material portion encloses the connecting area between the cable parts in an effective manner. Such an opening enables insertion of a cable part to the connecting area inside the protective cover. Advantageously, the second material portion is fixedly attached to an outer surface of the first material portion in the vicinity of the first end portion. In this case, the second material portion will be positioned in the vicinity of the sheath of the cable. Thereby, it is possible to apply a solder to an area comprising the second material portion and the sheath of the cable and provide a soft soldering process such that a soft soldering joint is obtained connecting the protecting casing and the sheath of the cable to each other. The second material portion may have an annular shape. It is easy to accomplish a soft soldering joint having an extension around the whole periphery of the cable by means of an annular second material portion.

According to another embodiment of the invention, the protective casing comprises at least one prefabricated part comprising a first material portion and a fixedly connected second material portion. In this case, the second material portion has been attached to the first material portions in a factory or the like. The prefabricated part may comprise a second material portion fixedly attached to a first material by means of a hard soldering connection. Since the prefabricated part is prefabricated, the high temperature during the hard soldering process will not cause damage to the cables. Furthermore, it is possible to check the prefabricated part in the factory such that the first material portion and the second material portion have no damages.

According to another embodiment of the invention, the protective casing comprises two casing halves each comprising a first material portion and a fixedly attached second material portion such that the respectively casing halves are connectable to a sheath of a respective cable by means of a soft soldering process. The casing halves can be applied on the respective free ends of the cables before they are connected to each other. As soon as the cables have been connected to each other, the casing halves are pushed together such that they enclose the connecting area between the cable halves. Thereafter, the second material portions of the casing halves are connected to the sheaths of respective cables by means of a soft soldering process. Preferably, each of the casing halves comprise a third material portion of a third metal material fixedly attached to the first material portion wherein the third metal material has good soft soldering properties such that it is possible to provide a strength and tight connection between the third material portions of the casing halves by means of a soft soldering process. When the casing halves have been displaced to a closed together state, it is possible to accomplish a soft soldering joint between the third material portions of the casing halves, which holds the casing halves together in a safe manner. Preferably, the third material portions have an annular shape. In this case, it is easy to accomplish a soft soldering joint having an extension around the whole periphery of the casing halves.

According to another embodiment of the invention the first material portion comprises a stainless steel material. Deep-sea high voltage cables are subjected to high pressures and a corrosive environment. Stainless steel materials are strong and resistant to corrosion. Due to these properties, it is suitable to use a stainless steel material as a first material portion in casings for protecting joints between high voltage cable parts.

According to another embodiment of the invention, the second material portion comprises copper or a copper alloy or brass or a brass alloy. All these materials have good soft soldering properties and can with advantage be used in a second material portion of the protective casing. Preferably, the third material portion also comprises copper or a copper alloy or brass or a brass alloy. However, it is possible to use other materials than the above-mentioned with good soldering properties in the second material portion and in the third material portion of the protective casing. A prefabricated half of the protective casing may also include a fixedly attached third material portion. The third material portion has here been attached to the first material portions in a factory or the like. The prefabricated part may comprise a third material portion fixedly attached to the first material by means of a hard soldering connection. In this case, the high temperature during the hard soldering process will not case cause damage to the cable parts. Since the hard soldering process is performed in a factory, it is possible to check the first material portion and the third material portion such that they have no damages in the vicinity of the hard soldering joint.

BRIEF DESCRIPTION OF THE DRAWINGS

In the following the invention is described by way of an example with reference to the attached drawings, in which.

DETAILED DESCRIPTION OF A PREFERRED EMBODIMENT OF THE INVENTION

Figure 1:
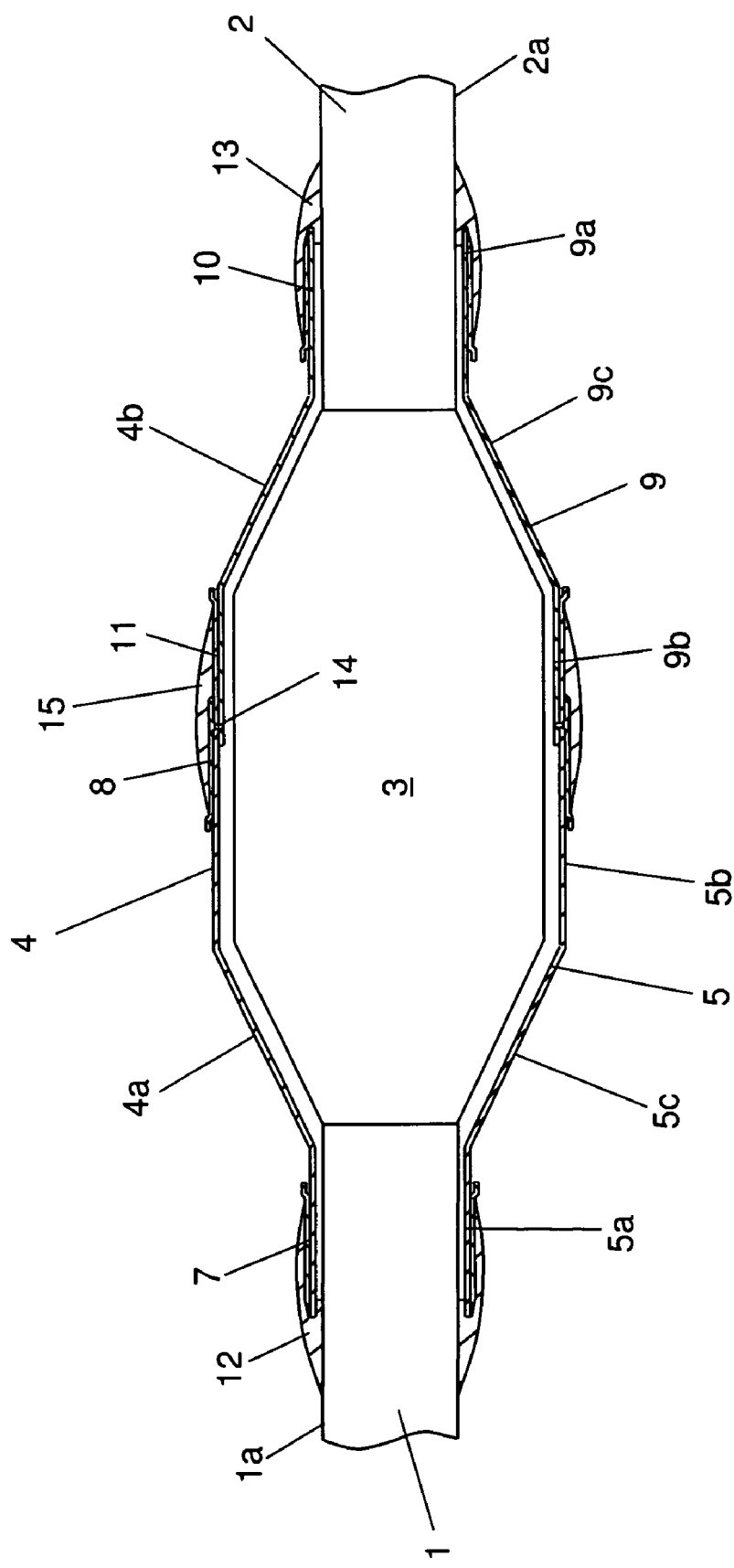
FIG. 1 shows a cross-section view of a protective casing for a joint between two high voltage cables and FIG. 2a-d shows different stages of a mounting process of the protective casing.

FIG. 1 shows a joint between a first cable 1 and a second cable 2 of a deep-sea high voltage cable. The first cable 1, 2 is provided with a water tight sheath 1a and the second cable 2 is provided with a water tight sheath 2a. The water tight sheaths 1a, 2a are manufactured of lead or copper. The conductors of the cables 1, 2, which not are visible in FIG. 1, are connected to each other in a connecting area 3. The connecting process of the conductors and the construction of the connecting area 3 are performed in a conventional manner with a cable joint. The connecting area 3 has a larger cross section area than the cables 1, 2. A protective casing 4 encloses the connecting area 3. The protective casing 4 constitutes of a first casing half 4a and a second casing half 4b which are mounted together such that they completely encloses the connecting area 3. The first casing half 4a and the second casing half 4b are prefabricated components.

The first casing half 4a comprises a first material portion 5 having a tubular shape. The first material portion 5 is made of a metal material, which is strong and resistant to corrosion. Such a metal material is here exemplified as a stainless steel material. The first material portion 5 comprises a first end part 5a having a substantially constant cross section area and an end opening dimensioned to receive the first cable 1. The first material portion 5 comprises a second end part 5b having a larger cross section than the first end part 5a. The second end part 5b has also a substantially constant cross section area. An intermediate part 5c of the first material portion 5 constitutes a connecting area between the first end part 5a and the second end part 5b. The intermediate part 5c has a cross section area increasing in a direction from the first end part 5a to the second end part 5b.

The first casing half 4a comprises a second material portion 7 having an annular shape. The second material portion 7 is fixedly attached to an outer surface of the first end part 5a of the first material portion 5 in the vicinity of the end opening. The second material portion 7 is made of a metal material having good soft soldering properties. The second material portion is preferably made of copper or a copper alloy or brass or a brass alloy. In this case, the second material portion 7 is fixedly attached to the outer surface of the first end part 5a by means of a hard soldering connection. The first casing half 4a comprises a third material portion 8 having an annular shape. The third material portion 8 is fixedly attached to an outer surface of the second end part 5b of the first material portion 5. The third material portion 8 is also made of a metal material having good soft soldering properties. The third material portion 8 can be made of copper or a copper alloy or brass or a brass alloy. Advantageously, the third material portion 8 is also fixedly attached to the outer surface of the first end part 5a by means a hard soldering connection.

The second casing half 4b has a substantially corresponding construction as the first casing half 4a. The second casing half 4b comprises a first material portion 9 having a tubular shape. The first material portion 9 is made of a metal material which is very strong and resistant to corrosion. The metal material is here exemplified as a stainless steel material. The first material portion 9 comprises a first end part 9a having a substantially constant cross section area and an opening dimensioned to receive the second cable 2. The first tubular material portion 9 comprises a second end part 9b having a larger cross section than the first end part 9a. The second end part 9b has also a substantially constant cross section area. An intermediate part 9c of the first material portion 9 constitutes a connecting area between the first end part 9a and the second end part 9b. The intermediate part 9c has a cross section area increasing in a direction from the first end part 9a to the second end part 9b.

The second casing half 4b comprises a second material portion 10 having an annular shape. The second material portion 10 is fixedly attached to an outer surface of the first end part 9a of the first material portion 9 in the vicinity of the end opening. The second material portion 10 is made of a metal material having good soft soldering properties. The second material portion 10 is preferably made of copper or a copper alloy or brass or a brass alloy. Preferably, the second material portion 10 is fixedly attached to the outer surface of the first end part 9a by means a hard soldering. The second casing half 4b comprises a third material portion 11 having an annular shape. The third material portion 11 is fixedly attached to an outer surface of the second end part 9b of the first material portion 9. The third material portion 11 is also made of a metal material having good soft soldering properties. The third material portion 11 can be made of copper or a copper alloy or brass or a brass alloy. Preferably, the third material portion 11 is fixedly attached to the outer surface of the first end part 9a by means a hard soldering connection.

The first end part 5a of the first casing half 4a has been connected to the sheath 1a of the first cable 1 by means of a soft soldering joint 12. The soft soldering joint is formed by a suitable solder. The soft soldering joint 12 connects the annular second material portion 7 of the first casing half 4a and the sheath 1a of the first cable 1. In a corresponding manner, the first end part 9a of the second casing half 4b has been connected to the sheath 2a of the second cable 2 by means of a soft soldering joint 13. The soft soldering joint 13 connects the annular second material portion 10 of the second casing half 4b and the sheath 2a of the first cable 2. The second end part 9b of the second casing half 4b has a somewhat smaller outer diameter than the second end part 5b of the first casing half 4a. The second end part 5b of the first casing half 4a and the second end part 9b of the second casing half 4b have here been displaced to a close together state. In this state the outer end of the second end part 9b of the second covering half 4b has been displaced a small distance into the second end part 5b of the first casing half 4a. One or several position elements 14 have been inserted through holes in the second end part 5b of the second casing half 4a and the second end part 9b of the first casing half 4b for holding the halves 4a, 4b together in this state during a soft soldering process. Thereafter, a soft soldering process is performed such that a soft soldering joint 15 is accomplished which connects the first casing half 4a and the second casing half 4b permanently to each other.

Figure 2A:
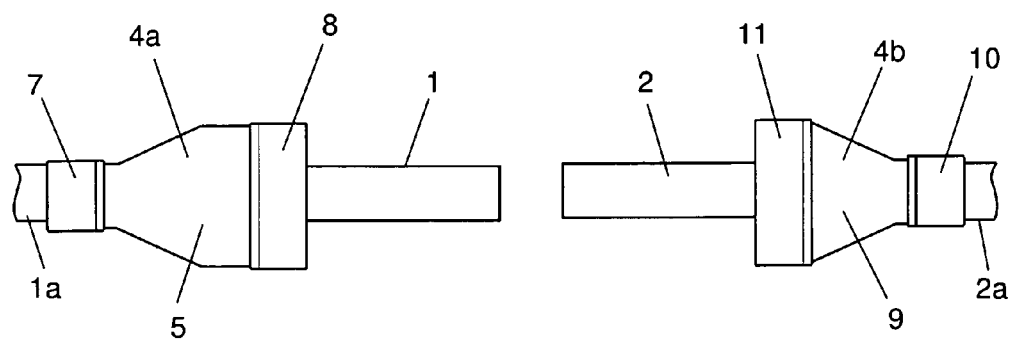

FIG. 2a shows a first stage of the mounting process of the protective casing 4. The mounting process is performed on a cable ship or the like before the cable is laid in the sea. The first casing half 4a has here been applied on a free end of the first cable 1 and the second casing half 4b has been applied on a free end of the second cable 2. The first casing half 4a and the second casing half 4b are prefabricated components. Consequently, the annular second material portion 7, 10 and the annular third material portions 8, 11 have already been attached to the first material portions 5, 9 of the respective casing halves 4a, 4b in a factory or the like. The annular second material portion 7, 10 and the annular third material portions 8, 11 have preferably been attached to the first material portions 5, 9 by a hard soldering process.

Figure 2B:
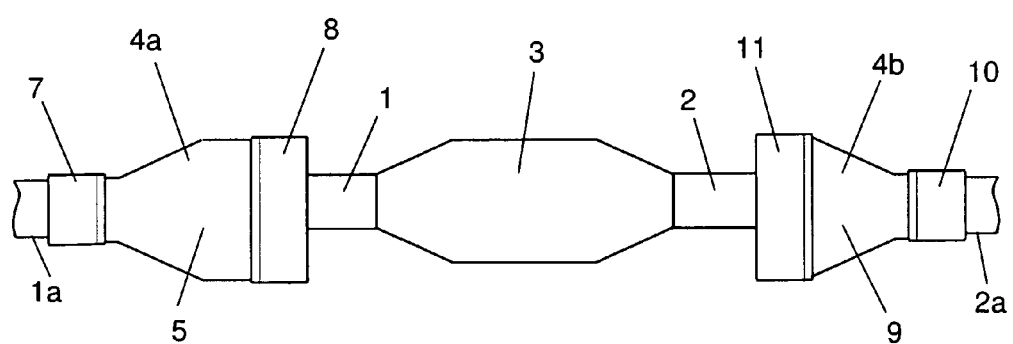
Figure 2C:
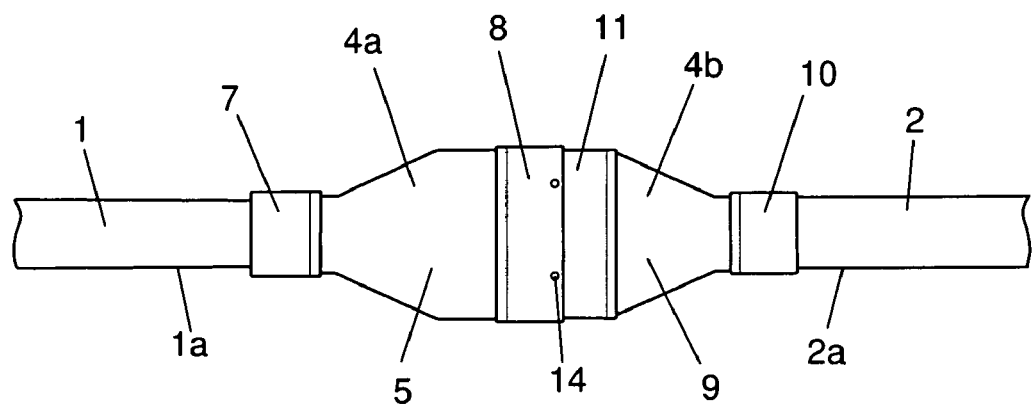
Figure 2D:
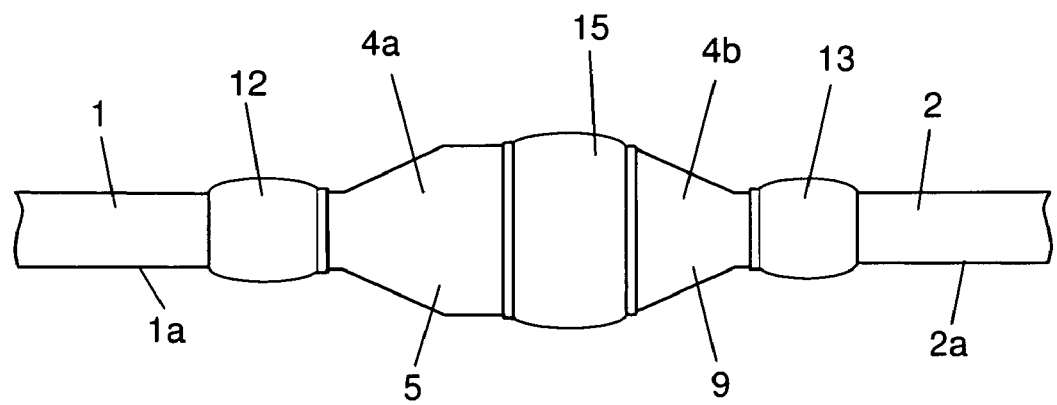

The first casing half 4a and the second casing half 4b have been pushed to a distance from each other on the respectively cables 1, 2 such that it is possible to connect the conductors of the cables 1, 2 to each other and to construct the connecting area 3. FIG. 2b shows the finished connecting area 3 which has a larger cross section area than the cable parts 2, 3. Thereafter, the casing halves 4a, 4b are pushed to the close together state which is shown in FIG. 2c. Position elements 14 have here been inserted through correspondingly arranged holes such that the casing halves 4a, 4b are held in the close together state. A suitable solder layer is then applied around the whole periphery of the outer surfaces of the annular third material portions 8, 11. The solder is heated in a suitable manner to its melt temperature. The solder has a melt temperature which is lower than 450° C. during a soft soldering process. Therefore, the heat from the soldering process is too low to damage the connecting area 3. After that, the solder is cooled and solidified such that it forms a joint 15 covering the outer surfaces of the third material portions 8, 11. Such a soldered joint 15 having an extension around the whole periphery of the third material portions 8, 11 holds the casing halves 4a, 4b together in a safe manner. Since both the third material portions 8, 11 is made of a material having good soft soldering properties, the joint 15 will be strong and water tight.

After that, a solder layer is applied on the outer surfaces of the annular second material portion 7 of the first covering half 4a and the adjacent sheath 1a of the first cable 1. The solder is heated to its melt temperature and cooled such that the solder forms a joint 12 covering the outer surfaces of the second material portion 7 and the adjacent area of the sheath 1a of the first cable 1. Since the second material portion 7 is made of a material having good soft soldering properties and the sheath 1a is made of lead or copper, which also have good soft soldering properties, the joint 12 will be strong and tight. The heat from the soft soldering process is too low to damage the sheath 1a of the first cable 1. Finally, a solder layer is applied on the outer surfaces of the annular second material portion 10 of the second covering half 4b and the adjacent sheath 2a of the second cable part 2. The solder is heated to its melt temperature and cooled such that the solder forms a joint 13 covering the outer surfaces of the second material portion 10 and the adjacent area of the sheath 2a of the second cable 2. Since the second material portion 10 is made of a material having good soft soldering properties and the sheath 2a is made of lead or copper, which also have good soft soldering properties, the joint 13 will be strength and tight. The heat from the soft soldering process is too low to damage the sheath 2a of the second cable 2.

The invention is not in any way restricted to the embodiment described in the figures, but may be varied freely within the scope of the claims. For example the protective casing 4 may be a protective casing for a termination of a high voltage cable or a protective casing for a cross-connection of high voltage cables.

The invention claimed is:

1. A protective casing for a joint, termination or cross-connection of at least one high voltage cable, the protective casing comprising:
   a first material portion of a first metal material, the first material portion having a first end and a second end; and
   a second material portion of a second metal material which is fixedly attached to the first material portion in the vicinity of the first end of the first material portion, wherein the second metal material has good soft soldering properties so as to provide a strong and tight connection between the first end of the second material portion of the protective casing and a sheath of the at least one cable by a soft soldering process.

2. The protective casing according to claim 1, wherein the first material portion is tubular and the first end part has an opening dimensioned to receive the at least one cable.

3. The protective casing according to claim 2, wherein the second material portion is fixedly attached to an outer surface of the first material portion in the vicinity of the first end part.

4. The protective according to claim 1, wherein the second material portion has an annular shape.

5. The protective casing according to claim 1, wherein the protective casing comprises at least one prefabricated part comprising the first material portion and the fixedly connected second material portion.

6. The protective casing according to claim 1, wherein the second material portion is fixedly attached to the first material portion by a hard soldering connection.

7. The protective casing according to claim 1, wherein the protective casing comprises two casing halves each comprising a first material portion and a fixedly attached second material portion such that the respectively casing halves are connectable to a sheath of a respective cable by a soft soldering process, each first material portion comprising a first end and a second end, wherein the first ends are attached to the at least one cable and the second ends are attached to each other.

8. The protective casing according claim 7, wherein each of the casing halves comprises a third material portion of a third metal material fixedly attached to the first material portion wherein the third metal material has good soft soldering properties so as to provide a strong and tight connection between the third material portions of the casing halves by a soft soldering process.

9. The protective casing according to claim 8, wherein the third material portions have an annular shape.

10. The protective casing according to claim 8, wherein the third material portion comprises copper or a copper alloy or brass or a brass alloy.

11. The protective casing according to claim 7, wherein said third material portion is fixedly attached to the first material portion by a hard soldering connection.

12. The protective casing according to claim 1, wherein the first material portion comprises a stainless steel material.

13. The protective casing according to claim 1, wherein the second material portion comprises copper or a copper alloy or brass or a brass alloy.

14. A high voltage cable, comprising:

at least one protective casing comprising a first material portion of a first metal material and including a portion having a first end and a second end, the at least one protective casing further comprising a second material portion of a second metal material which is fixedly attached to the first material portion in the vicinity of the first end of the first material portion, wherein the second metal material has good soft soldering properties so as to provide a strong and tight connection between the first end of the second material portion of the protective casing and a sheath of the at least one cable by a soft soldering process, wherein the at least one protective casing is fixedly attached to the sheath of the cable by soft soldering between the second material portion and the sheath of the cable.

* * * * *